United States Patent
Fauber

(10) Patent No.: US 11,625,438 B2
(45) Date of Patent: Apr. 11, 2023

(54) MONITORING INFORMATION PROCESSING SYSTEMS UTILIZING CO-CLUSTERING OF STRINGS IN DIFFERENT SETS OF DATA RECORDS

(71) Applicant: Dell Products L.P., Round Rock, TX (US)

(72) Inventor: Benjamin Fauber, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 373 days.

(21) Appl. No.: 16/826,562

(22) Filed: Mar. 23, 2020

(65) Prior Publication Data

US 2021/0294850 A1  Sep. 23, 2021

(51) Int. Cl.
| | |
|---|---|
| *G06F 16/906* | (2019.01) |
| *G06Q 50/26* | (2012.01) |
| *G06F 16/903* | (2019.01) |
| *G06F 21/62* | (2013.01) |
| *G06F 16/901* | (2019.01) |
| *G06Q 30/02* | (2012.01) |

(52) U.S. Cl.
CPC ........ *G06F 16/906* (2019.01); *G06F 16/9024* (2019.01); *G06F 16/90344* (2019.01); *G06F 21/6218* (2013.01); *G06Q 50/265* (2013.01); *G06Q 30/0205* (2013.01)

(58) Field of Classification Search
CPC ...... G06F 16/285; G06F 16/35; G06F 16/906; G06F 16/355; G06F 16/55; G06F 16/75; G06F 16/9024; G06F 16/90344; G06F 21/6218
See application file for complete search history.

(56) References Cited

U.S. PATENT DOCUMENTS

2017/0111245 A1* 4/2017 Ishakian ............ G06Q 10/0633
2019/0095472 A1* 3/2019 Griffith ................. G06F 16/256
(Continued)

OTHER PUBLICATIONS

Wang et al. "Toward Scalable Hierarchical clustering and co-clustering methods: application to the cluster Hypothesis in information retrieval", Sep. 20, 2019.*
(Continued)

*Primary Examiner* — Cindy Nguyen
(74) *Attorney, Agent, or Firm* — Ryan, Mason & Lewis, LLP

(57) ABSTRACT

An apparatus includes a processing device configured to obtain first and second sets of data records, each data record comprising a string associated with an attribute. The processing device is also configured to generate a similarity matrix, wherein entries of the similarity matrix comprise values characterizing similarity between respective pairs of the strings comprising a first string from a data record in the first set and a second string from a data record in the second set. The processing device is further configured to construct a graph network based on the similarity matrix comprising edges connecting pairs of the data records based on values of entries in the similarity matrix, perform a clustering operation on the graph network to identify clusters, and to initiate remedial action responsive to identifying a given cluster comprising at least one data record from each of the first and second sets of data records.

20 Claims, 9 Drawing Sheets

(56) References Cited

U.S. PATENT DOCUMENTS

| | | | |
|---|---|---|---|
| 2020/0112574 A1* | 4/2020 | Koral | G06N 3/0454 |
| 2020/0301972 A1* | 9/2020 | Wang | G06N 20/10 |
| 2020/0394658 A1* | 12/2020 | Chen | G06Q 20/385 |

OTHER PUBLICATIONS

Jaya et al. "NodeTrix-Community hierarchy : techniques for finding hierarchial communities for visual analytis of small-world networks" Copyright 2017 by SCITEPRESS.*

G. Govaert et al., "Co-Clustering: Models, Algorithms and Applications," John Wiley & Sons, Inc.: Hoboken, New Jersey, 2014, 243 pages.

A. Backurs et al., "Edit Distance Cannot be Computed in Strongly Subquadratic Time (unless SETH is false)." Proceedings of the Forty-seventh Annual ACM Symposium on Theory of Computing, Jun. 14-17, 2015, pp. 51-58.

S. Bandyopadhyay et al., "Unsupervised Classification: Similarity Measures, Classical and Metaheuristic Approaches, and Applications." Springer Verlag: Berlin Heidelberg, 2013, pp. 59-74.

A.-L. Barabási et al., "Network Biology: Understanding the Cell's Functional Organization." Nature Reviews Genetics, Feb. 2004, 15 pages.

A.-L. Barabási et al., "Network Medicine: A Network-based Approach to Human Disease." Nature Reviews Genetics, Jan. 2011, pp. 13 pages.

P. W. Battaglia et al., "Relational Inductive Biases, Deep Learning, and Graph Networks." Oct. 17, 2018, arxiv:1806.01261v3, 40 pages.

M. Bilenko et al., "Learning to Combine Trained Distance Metrics for Duplicate Detection in Databases." Technical Report AI 02 296, Artificial Intelligence Lab, The University of Texas at Austin, 2002, 19 pages.

M. Bilenko et al., "Adaptive Name Matching in Information Integration." IEEE Intell. Syst. 2003, 8 pages.

E. Otte et al., "Social Network Analysis: A Powerful Strategy, also for the Information Sciences." Journal of Information Science, 2002, vol. 28, No. 6, pp. 441-453.

V. D. Blondel et al., "Fast Unfolding of Communities in Large Networks." Jul. 25, 2008, arXiv:0803.0476v2, 12 pages.

W. W. Cohen et al., "A Comparison of String Metrics for Matching Names and Records." Proceedings of the 2003 International Conference on Information Integration on the Web, Aug. 2003, 6 pages.

T. H. Cormen et al., "Introduction to Algorithms." Massachusetts Institute of Technology Press: Cambridge, Massachusetts, 2009; 3rd ed., pp. 43-64, 591.

P. Christen, "A Comparison of Personal Name Matching: Techniques and Practical Issues." Technical Report TR CS 06 02, Department of Computer Science, The Australian National University, Canberra, Australia, 2002, 5 pages.

S. H. Strogatz, "Exploring Complex Networks." Nature, Mar. 8, 2001, pp. 268-276.

S. Fortunato et al., "Community Detection in Networks: A User Guide." Nov. 3, 2016, arXiv:1608.00163v2, 43 pages.

G. Navarro, "A Guided Tour to Approximate String Matching." ACM Computing Surveys, Mar. 2001, vol. 33, No. 1, pp. 31-88.

V. I. Levenshtein, "Binary Codes Capable of Correcting Deletions, Insertions, and Reversals." Soviet Physics—Doklady, Feb. 1966, vol. 10, No. 8, pp. 707-710.

H. Small, "Co-citation in the Scientific Literature: A New Measure of the Relationship Between Two Documents." Journal of the American Society for Information Science, Jul.-Aug. 1973, pp. 265-269.

A. Marzal et al., "Computation of Normalized Edit Distance and Applications." IEEE Transactions on Pattern Analysis and Machine Intelligence, Sep. 1993, vol. 15, No. 9, pp. 926-932.

J. Betten, "Creep Mechanics." Springer Verlag: Berlin, 2005; pp. 248-252.

C. D. Manning et al., "Introduction to Information Retrieval." Cambridge University Press, New York, NY, 2008, 581 pages.

L. Ramalho, "Fluent Python: Clear, Concise, and Effective Programming." O'Reilly Media, Inc., Sebastopol, CA, 2015, 766 pages.

W. E. Winkler, "Overview of Record Linkage and Current Research Directions." Technical Report, Statistical Research Division, U. S. Census Bureau, Washington, DC, 2006, 44 pages.

M. A. Jaro, "Advances in Record-Linkage Methodology as Applied to Matching the 1985 Census of Tampa, Florida." J. Am. Stat. Assoc. Jun. 1989, vol. 84, No. 406, pp. 414-420.

U.S. Appl. No. 16/776,126 filed in the name of Benjamin Fauber, filed Jan. 29, 2020, and entitled "Monitoring an Enterprise System Utilizing Hierarchical Clustering of Strings in Data Records."

* cited by examiner

| MAILING ADDRESS | SOURCE LIST | CO-CLUSTER NAME |
|---|---|---|
| 201 park st columbia south carolina 29201 | A | 1 |
| 1400 main st columbia south carolina 29201 | B | 1 |
| 600 13th st nw washington district of columbia 20005 | A | 2 |
| 900 16th st nw washington district of columbia 20006 | A | 2 |
| 1325 2nd st ne washington district of columbia 20002 | B | 2 |
| 515 15th st nw washington district of columbia 20004 | B | 2 |
| 775 12th st nw washington district of columbia 20005 | B | 2 |
| 4925 n scottsdale rd scottsdale arizona 85251 | A | 3 |
| 6040 n scottsdale rd scottsdale arizona 85253 | B | 3 |
| 1341 crossways blvd chesapeake virginia 23320 | A | 4 |
| 1446 crossways blvd chesapeake virginia 23320 | B | 4 |
| 1454 crossways blvd chesapeake virginia 23320 | B | 4 |
| 1828 e sam houston pkwy s pasadena texas 77503 | A | 5 |
| 3640 e sam houston pkwy s pasadena texas 77505 | B | 5 |
| 4711 e sam houston pkwy s pasadena texas 77505 | B | 5 |
| 726 broadway new york new york 10003 | A | 6 |
| 1567 broadway new york new york 10036 | B | 6 |
| 170 broadway new york new york 10007 | B | 6 |
| 1717 broadway new york new york 10019 | B | 6 |
| 7200 w interstate 40 amarillo texas 79106 | A | 10 |
| 6600 interstate 40 w amarillo texas 79106 | B | 10 |
| 6700 interstate 40 w amarillo texas 79106 | B | 10 |
| 700 17th st denver colorado 80202 | A | 13 |
| 321 17th st denver colorado 80202 | B | 13 |
| 750 15th st denver colorado 80202 | B | 13 |
| 211 main st san francisco california 94105 | A | 18 |
| 4736 msn st san francisco california 94112 | A | 18 |
| 515 mason st san francisco california 94102 | B | 18 |
| 780 msn st san francisco california 94103 | B | 18 |
| 2151 msn college blvd santa clara california 95054 | A | 28 |
| 2807 msn college blvd santa clara california 95054 | A | 28 |
| 2700 msn college blvd santa clara california 95054 | B | 28 |
| 1250 w mockingbird ln dallas texas 75247 | A | 52 |
| 2333 w mockingbird ln dallas texas 75235 | B | 52 |

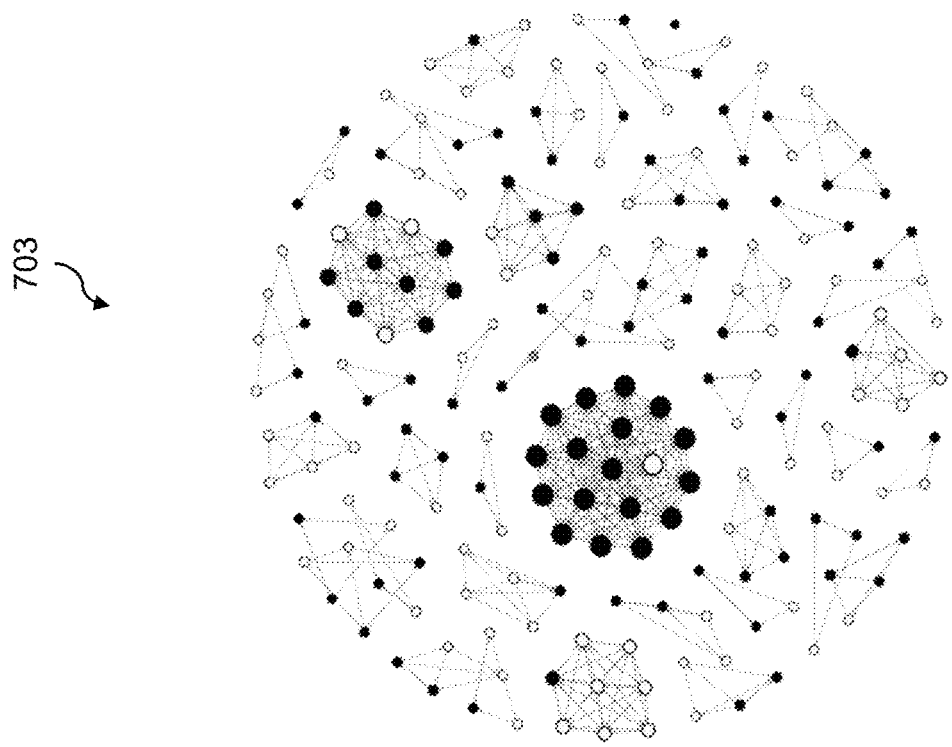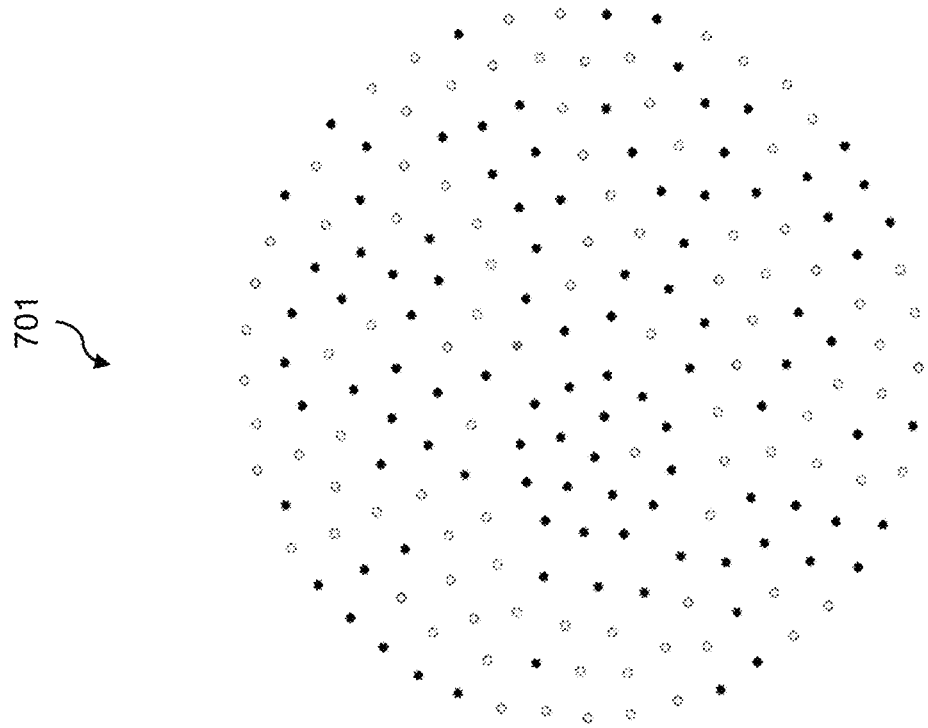
FIG. 7

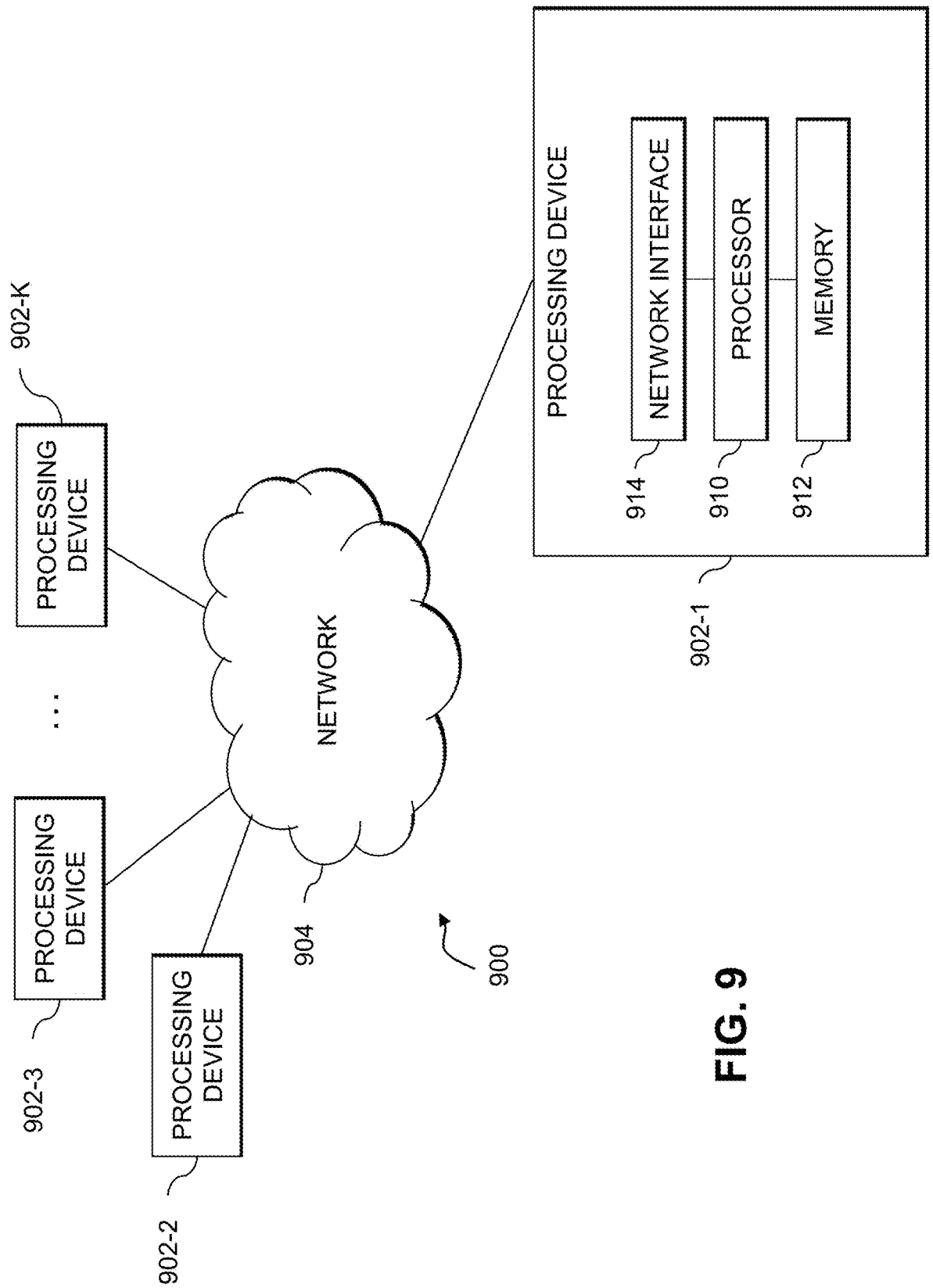

MONITORING INFORMATION PROCESSING SYSTEMS UTILIZING CO-CLUSTERING OF STRINGS IN DIFFERENT SETS OF DATA RECORDS

FIELD

The field relates generally to information processing, and more particularly to techniques for managing data.

BACKGROUND

In many information processing systems, graph networks are used to provide rich compositional or contextual information. A graph network may include a plurality of nodes and edges or links connecting the nodes, with the edges or links representing relationships between the nodes. To construct a graph network, therefore, there is a need to define explicit relationships between the nodes. Each of the nodes in a graph network may represent a data record, which can comprise strings of unstructured text data. Unstructured text data typically requires special treatment, such as manual screening or manual customization and maintenance of a large set of rules that can be used to determine correspondence with predefined themes of interest. Such processing is unduly tedious and time-consuming, particularly for large volumes of unstructured text data.

SUMMARY

Illustrative embodiments of the present disclosure provide techniques for monitoring information processing systems utilizing co-clustering of strings in different sets of data records.

In one embodiment, an apparatus comprises at least one processing device comprising a processor coupled to a memory. The at least one processing device is configured to perform the step of obtaining two or more sets of data records, each of the data records in the two or more sets of data records comprising at least one string associated with at least one attribute. The at least one processing device is also configured to perform the step of generating at least one similarity matrix, wherein entries of the at least one similarity matrix comprise values characterizing similarity between respective pairs of the strings associated with the at least one attribute, each pair of strings comprising a first string from one of the data records in a first one of the two or more sets of data records and a second string from one of the data records in a second one of the two or more sets of data records. The at least one processing device is further configured to perform the step of constructing at least one graph network based at least in part on the at least one similarity matrix, the at least one graph network comprising edges connecting pairs of the data records in the two or more sets of data records based at least in part on values of entries in the at least one similarity matrix, at least one of the edges connecting a first data record in the first set of data records with a second data record in the second set of data records. The at least one processing device is further configured to perform the step of performing at least one clustering operation on the at least one graph network to identify one or more clusters for the at least one attribute, a given one of the one or more clusters comprising at least one data record from the first set of data records and at least one data record from the second set of data records. The at least one processing device is further configured to perform the step of initiating at least one remedial action responsive to identifying the given cluster.

These and other illustrative embodiments include, without limitation, methods, apparatus, networks, systems and processor-readable storage media.

BRIEF DESCRIPTION OF THE DRAWINGS

FIG. 5 shows a table illustrating co-clustering of U.S. mailing address strings in an illustrative embodiment.

FIG. 7 shows a graph network before and after application of a string co-clustering algorithm in an illustrative embodiment.

FIGS. 8 and 9 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
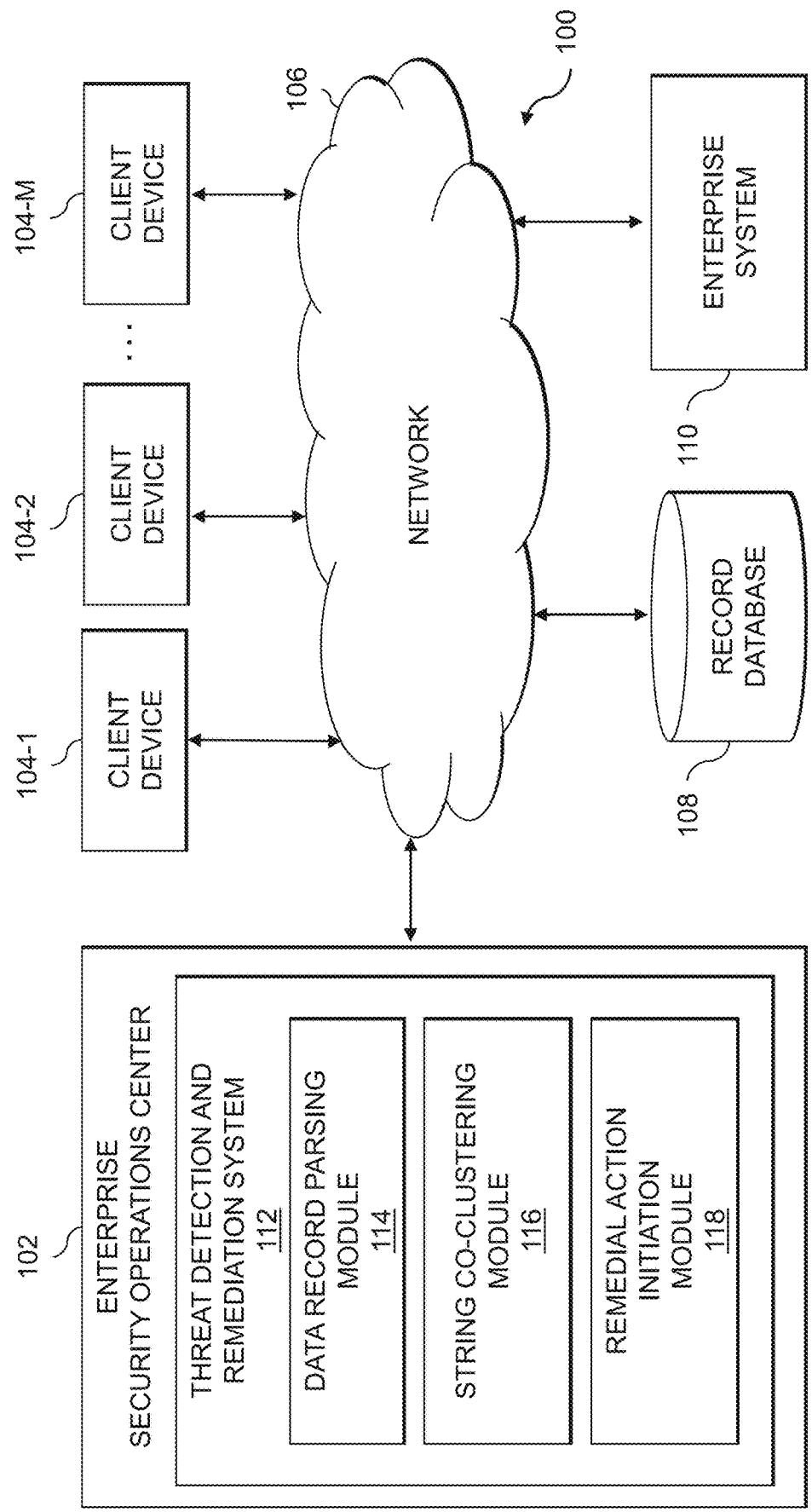
FIG. 1 is a block diagram of an information processing system for monitoring information processing systems utilizing co-clustering of strings in different sets of data records in an illustrative embodiment.

FIG. 1 shows an information processing system 100 configured in accordance with an illustrative embodiment. The information processing system 100 is assumed to be built on at least one processing platform and provides functionality for monitoring an enterprise system 110 utilizing co-clustering of strings contained in independent sets of data records associated with the enterprise system 110. As used herein, an "enterprise system" includes a system associated with at least one enterprise. Thus, in some embodiments, the enterprise system 110 may be associated with or include portions of two or more enterprises or other entities. The information processing system 100 includes a security operations center (SOC) 102, which is coupled via a network 106 to the enterprise system 110. The enterprise system 110, or assets of an information technology (IT) infrastructure associated therewith, is assumed to be accessed, over the network 106, by client devices 104-1, 104-2, . . . 104-M (collectively, client devices 104). The assets of the IT infrastructure may include, by way of example, physical and virtual computing resources in the enterprise system 110. Physical computing resources may include physical hardware such as servers, storage systems, networking equipment, Internet of Things (IoT) devices, other types of processing and computing devices, etc. Virtual computing resources may include virtual machines (VMs), software containers (also referred to herein as containers), etc. The assets of the enterprise system 110 are assumed to produce logs or other data records (either directly, or via monitoring tools monitoring such assets). Such logs or data records, or information derived therefrom, are stored in record database 108 as described in further detail below.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc. The client devices 104 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The record database 108, as discussed above, is configured to store and record information relating to the enterprise system 110, such as a plurality of data records where each data record includes one or more strings (e.g., unstructured text data) associated with one or more attributes. The data records may include, for example, logs of interactions between users of the client devices 104 and the enterprise system 110. In some embodiments, it is assumed that the data records in the record database 108 include at least two different or independent sets of data records that are to be compared against one another for string co-clustering as described in further detail below.

The record database 108 in some embodiments is implemented using one or more storage systems or devices associated with the SOC 102 or the enterprise system 110. In some embodiments, one or more of the storage systems utilized to implement the record database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the SOC 102, the client devices 104, the record database 108, and the enterprise system 110, as well as to support communication between the SOC 102, client devices 104, record database 108, enterprise system 110 and other related systems and devices not explicitly shown.

In the present embodiment, alerts or notifications generated by a threat detection and remediation system 112 of the enterprise SOC 102 are provided over network 106 to client devices 104, or to a system administrator, information technology (IT) manager, or other authorized personnel via one or more host agents. Such host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 112. For example, a given host agent may comprise a mobile telephone equipped with a mobile application configured to receive alerts from the enterprise SOC 102 or the threat detection and remediation system 112 and to provide an interface for the host agent to select particular remedial measures for responding to the alert or notification. Examples of such remedial measures may include blocking access by one or more of the client devices 104 to the enterprise system 110 or assets thereof, requiring user input or authentication by the client devices 104 to obtain information from or otherwise utilize one or more resources or assets of the enterprise system 110, triggering further review of the enterprise system 104 or resources or assets thereof, etc. Further examples of remedial measures or actions will be described below.

It should be noted that a "host agent" as this term is generally used herein may comprise an automated entity, such as a software entity running on a processing device. Accordingly, a host agent need not be a human entity.

As shown in FIG. 1, the enterprise SOC 102 comprises threat detection and remediation system 112. As will be described in further detail below, the threat detection and remediation system 112 is configured to monitor the enterprise system 110 utilizing string co-clustering of data records associated with the enterprise system 110.

Although shown as an element of the enterprise SOC 102 in this embodiment, the threat detection and remediation system 112 in other embodiments can be implemented at least in part externally to the enterprise SOC 102, for example, as a stand-alone server, set of servers or other type of system coupled to the network 106. In some embodiments, the threat detection and remediation system 112 may be implemented at least in part within one or more of the client devices 104.

The threat detection and remediation system 112 in the FIG. 1 embodiment is assumed to be implemented using at least one processing device. Each such processing device generally comprises at least one processor and an associated memory, and implements one or more functional modules for controlling certain features of the threat detection and remediation system 112. In the FIG. 1 embodiment, the threat detection and remediation system 112 comprises a data record parsing module 114, a string co-clustering module 116, and a remedial action initiation module 118.

The data record parsing module 114 is configured to obtain two or more sets of data records associated with the enterprise system 110 (e.g., directly from assets in an IT infrastructure associated with the enterprise system 110, from monitoring tools associated with the enterprise system 110, from the record database 108, etc.). The data record parsing module 114 is further configured to identify strings (e.g., of unstructured text data) that are associated with one or more attributes of interest (e.g., that are to be clustered and analyzed) in each of the two or more sets of data records. For example, each data record may include two strings, a first string associated with a mailing address and a second string associated with a name.

The string co-clustering module 116 is configured to generate at least one similarity matrix for the strings associated with the at least one attribute (e.g., one for each attribute of interest). Entries of the at least one similarity matrix comprise values characterizing similarity between respective pairs of the strings associated with the at least one attribute, where each pair of strings comprises a first string from one of the data records in a first one of the two or more sets of data records and a second string from one of the data records in a second one of the two or more sets of data records. The string co-clustering module 116 is also configured to apply a thresholding filter to values in the entries of the at least one similarity matrix to create at least one biadjacency matrix (e.g., one for each similarity matrix), and to construct at least one graph network of the plurality of data records (e.g., one for each biadjacency matrix). The at least one graph network comprises edges connecting pairs of the data records in the two or more data records based at least in part on values of entries in the at least one biadjacency matrix. At least one of the edges connects a first data record in the first set of data records with a second data record in the second set of data records. The string co-clustering module 116 is further configured to perform at least one clustering operation on the at least one graph network to identify one or more clusters of the two or more sets of data records for the at least one attribute (e.g., to identify clusters for each attribute). A given one of the one or more clusters comprises at least one data record from the first set of data records and at least one data record from the second set of data records.

The remedial action initiation module 118 is configured to initiate at least one remedial action in the enterprise system 110 responsive to identifying the given cluster. The type of remedial action depends on the attributes and data records being analyzed. For example, if the data records are associated with users accessing assets of the enterprise system 110, the remedial action may include blocking user access to assets or monitoring subsequent user access to assets responsive to the identified clusters indicating suspicious access patterns. The data records may alternatively be associated with assets of the enterprise system 110, and the remedial action may include applying security hardening procedures to assets or modifying the configuration of the assets responsive to the identified clusters indicating suspicious access patterns or other activity. It is to be appreciated that the particular arrangement of the SOC 102, the threat detection and remediation system 112, the data record parsing module 114, the string co-clustering module 116, and the remedial action initiation module 118 illustrated in the FIG. 1 embodiment is presented by way of example only, and alternative arrangements can be used in other embodiments. As discussed above, for example, the threat detection and remediation system 112, or portions thereof such as one or more of the data record parsing module 114, the string co-clustering module 116, and the remedial action initiation module 118 may in some embodiments be implemented internal to one or more of the client devices 104 or the enterprise system 110. As another example, the functionality associated with the data record parsing module 114, the string co-clustering module 116, and the remedial action initiation module 118 may be combined into one module, or separated across more than three modules with the multiple modules possibly being implemented with multiple distinct processors or processing devices.

At least portions of the data record parsing module 114, the string co-clustering module 116, and the remedial action initiation module 118 may be implemented at least in part in the form of software that is stored in memory and executed by a processor.

It is to be understood that the particular set of elements shown in FIG. 1 for monitoring the enterprise system 110 utilizing co-clustering of strings in different sets of data records associated with the enterprise system 110 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 112 may be implemented external to enterprise SOC 102, such that the enterprise SOC 102 can be eliminated.

In some embodiments, the threat detection and remediation system 112 may be part of or otherwise associated with a system other than the enterprise SOC 102, such as, for example, a critical incident response center (CIRC), a security analytics system, a security information and event management (STEM) system, a Governance, Risk and Compliance (GRC) system, etc.

The SOC 102 and other portions of the system 100 may be part of cloud infrastructure as will be described in further detail below. The cloud infrastructure hosting the SOC 102 may also host one or more of the client devices 104 or at least a portion of the enterprise system 110.

The SOC 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The SOC 102, client devices 104, record database 108 and enterprise system 110 or components thereof may be implemented on respective distinct processing platforms, although numerous other arrangements are possible. For example, in some embodiments at least portions of the SOC 102 and one or more of the client devices 104 or enterprise system 110 are implemented on the same processing platform. A given one of the client devices 104 or the enterprise system 110 can therefore be implemented at least in part within at least one processing platform that implements at least a portion of the SOC 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the SOC 102, client devices 104, record database 108 and enterprise system 110, or portions or components thereof, to reside in different data centers. Numerous other distributed implementations are possible. The SOC 102 or portions thereof can also be implemented in a distributed manner across multiple data centers.

Additional examples of processing platforms utilized to implement the SOC 102 and other portions of the system 100 in illustrative embodiments will be described in more detail below in conjunction with FIGS. 8 and 9.

It is to be appreciated that these and other features of illustrative embodiments are presented by way of example only, and should not be construed as limiting in any way.

An exemplary process for monitoring information processing systems utilizing co-clustering of strings in different sets of data records will now be described in more detail with reference to the flow diagram of FIG. 2. It is to be understood that this particular process is only an example, and that additional or alternative processes for monitoring information processing systems utilizing co-clustering of strings in different sets of data records may be used in other embodiments.

In this embodiment, the process includes steps 200 through 210. These steps are assumed to be performed by the threat detection and remediation system 112 of the SOC 102 utilizing the data record parsing module 114, the string co-clustering module 116, and the remedial action initiation module 118. The process begins with step 200, obtaining two or more sets of data records. Each of the data records in the two or more sets of data records comprises at least one string associated with at least one attribute. The two or more sets of data records may be obtained from an enterprise system (e.g., enterprise system 110) or more generally an information processing system. The two or more sets of data records are assumed to be independent of one another, and may be obtained from different data sources in the enterprise system.

In step 202, at least one similarity matrix is generated for the strings associated with the at least one attribute. Entries of the at least one similarity matrix comprise values characterizing similarity between respective pairs of the strings associated with the at least one attribute. Each pair of strings comprises a first string from one of the data records in a first one of the two or more sets of data records and a second string from one of the data records in a second one of the two or more sets of data records. Step 202 may comprise performing string similarity calculations for the pairs of the strings. The string similarity calculations may comprise one or more edit distance calculations (e.g., Levenshtein edit distance calculations, Jaro-Winkler edit distance calculations, etc.).

Figure 2:
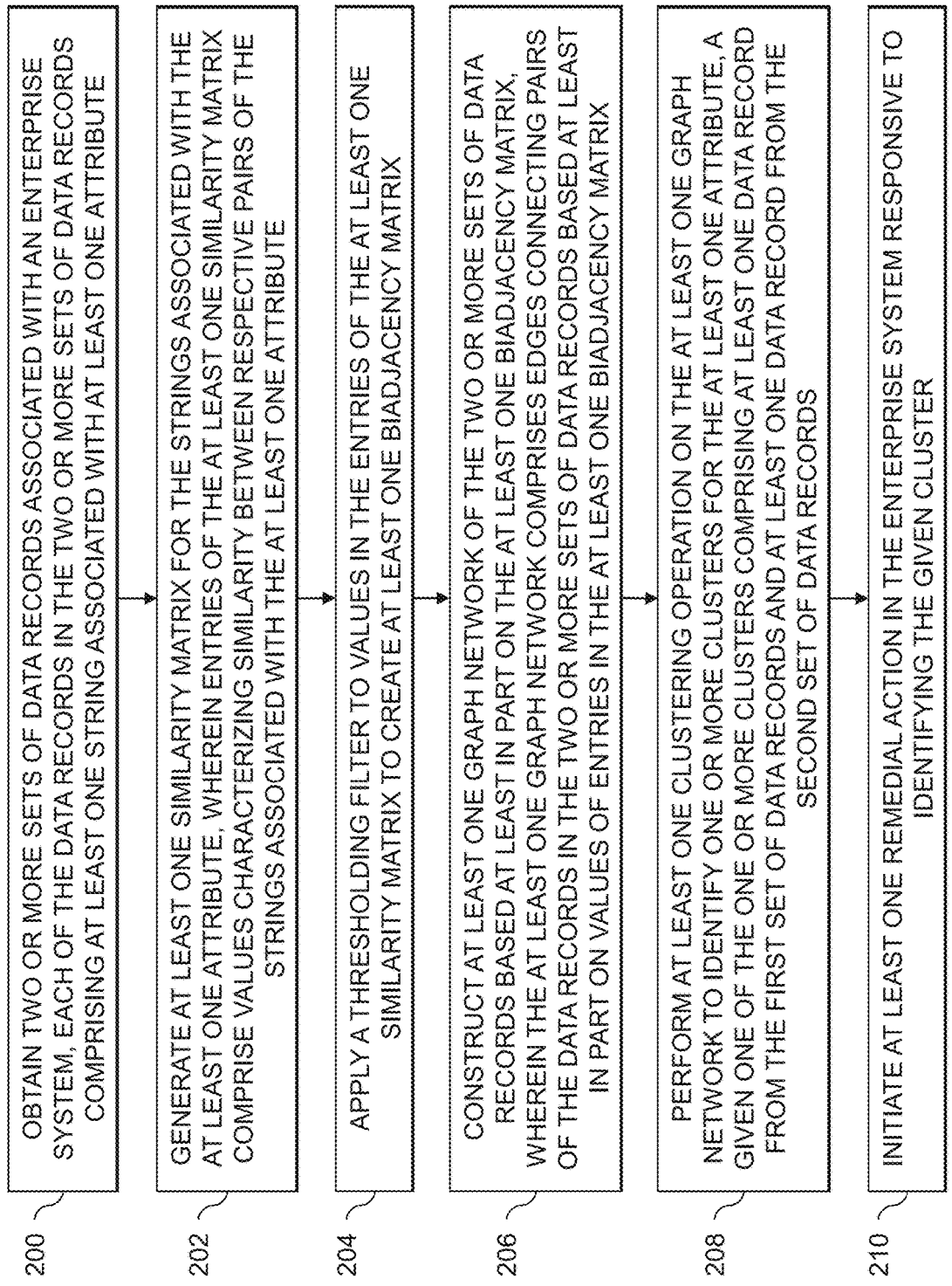
FIG. 2 is a flow diagram of an exemplary process for monitoring information processing systems utilizing co-clustering of strings in different sets of data records in an illustrative embodiment.

The FIG. 2 process continues with step 204, applying a thresholding filter to values in the entries of the at least one similarity matrix to create at least one biadjacency matrix. In step 206, at least one graph network of the two or more sets of data records is constructed based at least in part on the at least one biadjacency matrix. The at least one graph network comprises edges connecting pairs of the data records in the two or more sets of data records based at least in part on values of entries in the at least one biadjacency matrix. At least one of the edges connects a first data record in the first set of data records with a second data record in the second set of data records. The thresholding filter may comprise a hyperparameterized Heaviside step function. Step 204 may include setting entries of the at least one similarity matrix with values below a designated threshold to a first value and setting entries of the at least one similarity matrix with values at or above the designated threshold to a second value. Step 206 may include connecting pairs of the data records in the two or more sets of data records having entries in the at least one biadjacency matrix with the second value, and refraining from connecting pairs of the data records in the two or more sets of data records having entries in the at least one biadjacency matrix with the first value.

At least one clustering operation is performed on the at least one graph network in step 208 to identify one or more clusters for the at least one attribute. A given one of the one or more clusters comprises at least one data record from the first set of data records and at least one data record from the second set of data records. Step 208 may include performing community detection on the at least one graph network to identify the one or more clusters for the at least one attribute. The community detection algorithm may comprise a Louvain community detection algorithm.

In step 210, at least one remedial action is initiated responsive to identifying the given cluster. The two or more sets of data records may be associated with a plurality of assets of an IT infrastructure, and the plurality of assets may comprise physical or virtual computing resources in the IT infrastructure. Step 210 may include applying one or more security hardening procedures to one or more of the plurality of assets associated with the data records in the given cluster, modifying a configuration of one or more of the plurality of assets associated with the data records in the given cluster, etc. The two or more sets of data records may alternatively be associated with a plurality of users of the IT infrastructure. Step 210 may include blocking access by one or more of the plurality of users associated with the data records in the given cluster to one or more of the plurality of assets of the IT infrastructure, monitoring subsequent access by one or more of the plurality of users associated with the data records in the given cluster to one or more of the plurality of assets, etc.

In some embodiments, each of the data records in the two or more sets of data records comprises a first string associated with a first attribute and a second string associated with a second attribute. In such embodiments, step 202 may include generating a first similarity matrix for the first strings associated with the first attribute and a second similarity matrix for the second strings associated with the second attribute, step 204 may include applying a first thresholding filter to values in entries of the first similarity matrix to generate a first biadjacency matrix and applying a second thresholding filter to values in entries of the second similarity matrix to generate a second biadjacency matrix, and step 206 may include constructing a first graph network based at least in part on the first biadjacency matrix and constructing a second graph network based at least in part on the second biadjacency matrix. Where the at least one graph network comprises a first graph network for the first attribute and a second graph network for the second attribute, step 208 may include identifying a first set of one or more clusters of the data records in the two or more sets of data records in the first graph network for the first attribute and identifying a second set of one or more clusters of the data records in the two or more sets of data records in the second graph network for the second attribute. Step 210 may be performed responsive to identifying a given data record in one of the first set of data records and the second set of data records that is in a first cluster with a first subset of the data records in the two or more sets of data records for the first attribute and is in a second cluster with a second subset of the data records in the two or more sets of data records for the second attribute. The first attribute may comprise a mailing address and the second attribute may comprise a name.

As discussed above, string co-clustering may be used for unsupervised pattern recognition in various applications and use case scenarios, including but not limited to named entity recognition, record alignment, and anomaly detection. Various embodiments are described below and elsewhere herein with respect to an algorithm for co-clustering similar company names and similar mailing addresses from independent sources of strings. Advantageously, the techniques described herein enable the string co-clustering to be performed with a reasonable overall computational wall time and with favorable co-cluster contents. In some embodiments, strings from separate sources (e.g., a first source with m strings and a second source with n strings) are evaluated for similarity using one or more similarity calculations (e.g., an edit distance calculation such as normalized Levenshtein edit distance, a Jaro-Winkler edit distance also referred to herein as a Jaro similarity metric, etc.). The results of the similarity calculations are stored in an m×n similarity matrix. The algorithm may benefit from the correspondence of similarity and biadjacency matrices. Applying a thresholding filter (e.g., a hyperparameterized Heaviside function) to the similarity matrix results in a biadjacency matrix that is equivalent to a bipartite graph network, where the edges of the bipartite graph network connect the related strings. Community detection (e.g., using a Louvain community detection algorithm) may be performed on the bipartite graph network to provide the co-clusters of strings from the different data sources. Graph networks are sets of vertices or nodes connected by edges or links. Examples of graph networks include, but are not limited to, co-citation networks, social networks, and biological networks. Graph networks can provide rich compositional or contextual information and unique opportunities for contextual data analysis. Social network data sets may explicitly specify the relationships (e.g., edges) of the entities (e.g., nodes) within the graph, as such relationships may be defined a priori by the users of the social network. Conversely, many tabular data sets do not provide pre-defined connections or edges between data points. Inferring sparse structure from unstructured data is a challenging task. Unsupervised pattern recognition methods, such as clustering, often make use of a similarity metric such as Euclidean distance to infer structure from unstructured data. As noted above, in some embodiments Levenshtein edit distance and Jaro similarity metrics are used to infer structure from unstructured text string data. The resulting similarity matrices are transformed into biadjacency matrices, which enable a string co-clustering algorithm.

Various embodiments are described below in the context of an exemplary use case, namely, the assignment of approximate string similarity metrics to mailing addresses and name data (e.g., company name) for the purpose of record alignment. It should be appreciated, however, that this is just one example use case and that embodiments are not limited solely to co-clustering of string data for the purpose of record alignment, or in the specific context of record alignment of mailing address and name data. In other embodiments, for example, the string co-clustering algorithms described herein may be used for monitoring access patterns by users to assets of an IT infrastructure, for monitoring log data associated with assets of an IT infrastructure, etc.

Levenshtein edit distance provides a method for programmatically analyzing the number of single character deletions, insertions, and substitutions required to transform a first string (e.g., string a) into a second string (e.g., string b). The Levenshtein edit distance calculation is an example of what is more generally referred to herein as edit distance or an edit distance calculation. The edit distance $lev_{ab}$ between strings a and b is defined recursively as follows:

$$lev_{ab}(i, j) = \max(i, j), \text{ if } \min(i, j) = 0$$

$$= \min\begin{cases} lev_{ab}(i-1, j) + 1 \\ lev_{ab}(i, j-1) + 1 \\ lev_{ab}(i-1, j-1) + 1_{(a_i \neq b_j)} \end{cases}$$

where $lev_{ab}$ (i, j) is the distance between the first i characters of a and the first j characters of b, where i and j are positive integers. The first element of the min cases corresponds to a-to-b character deletion, the second to a-to-b character insertion, and the third to a-to-b character substitution. Levenshtein edit distance calculations demonstrate proficiency in detecting string similarity. For example, the Levenshtein edit distance calculation may provide an optimal solution, relative to other approximate string similarity methods, given U.S. census data containing mailing addresses. It should be appreciated, however, that embodiments are not limited solely to use with the Levenshtein edit distance calculation. Various other edit distance calculations may be used as desired.

String matching of proper names and personal names can in some cases be more challenging than string matching for mailing addresses. Various similarity algorithms may be used, including the Jaro similarity metric or algorithm. The Jaro similarity algorithm has three components or steps: (i) computing the string lengths of two strings denoted $s_1$ and $s_2$; (ii) finding the number of common characters in the two strings $s_1$ and $s_2$; and (iii) finding the number of character transpositions. These components or steps may be combined as shown in the following equation:

$$\Phi_j(s_1, s_2) = \frac{1}{3}\left(\frac{N_C}{len_{s1}} + \frac{N_C}{len_{s2}} + \frac{N_t}{2N_c}\right)$$

where $len_{s1}$ is the length of string $s_1$, $len_{s2}$ is the length of string $s_2$, $N_c$ is the number of characters in common in the strings $s_1$ and $s_2$, and $N_t$ is the number of character transpositions.

Figure 3:
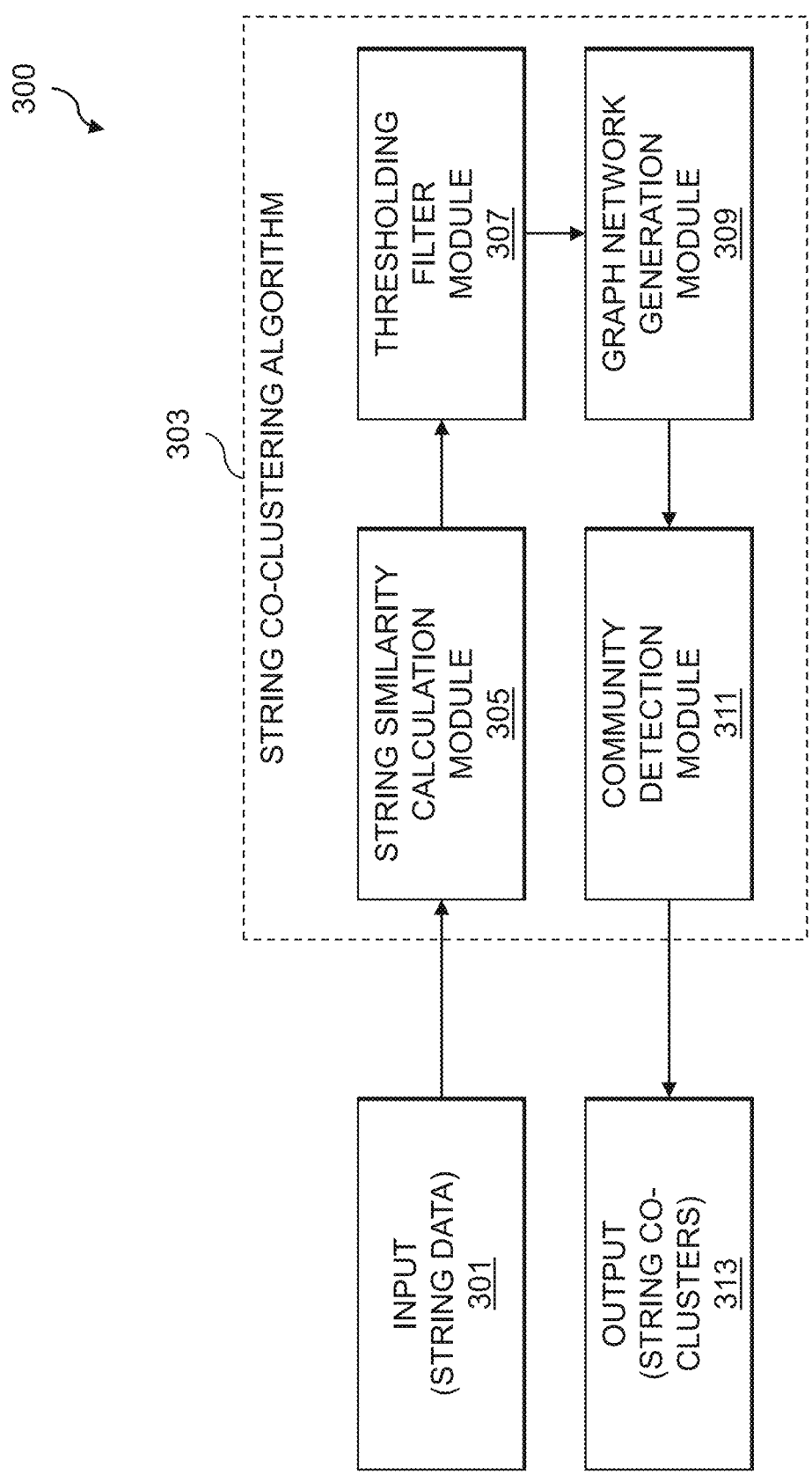
FIG. 3 illustrates a string co-clustering system in an illustrative embodiment.

FIG. 3 shows a string co-clustering system 300, where input 301 is provided to a string co-clustering algorithm 303 implementing a string similarity calculation module 305, a thresholding filter module 307, a graph network generation module 309, and a community detection module 311. The input 301 is assumed to comprise two independent lists of strings that are to be compared against each other to identify approximate string matches. The string co-clustering algorithm 303 provides as output 313 string co-clusters. The string similarity calculation module 305 is configured to compute normalized string similarity values (e.g., using Levenshtein edit distance, Jaro similarity metrics, combinations thereof, etc.), with the normalized similarity values being stored in a similarity matrix. The thresholding filter module 307 applies a thresholding filter to the similarity matrix, thus producing a biadjacency matrix. The output of the thresholding filter is passed into the graph network generation module 309 for further analysis with a generated graph network (e.g., a bipartite graph network). By considering each string as a node in a graph network, the string co-clustering algorithm 303 is configured to utilize the community detection module 311 to economically utilize community detection methods to provide the string co-clusters as the output 313. Advantageously, the string co-clustering algorithm 303 takes advantage of the related structures of the similarity matrix (e.g., the output of the string similarity calculations) and the biadjacency matrix (e.g., which represents the bipartite graph network). The thresholding filter serves as a graph coarsening hyperparameter.

The string co-clustering algorithm utilized in some embodiments will now be described in further detail. Let L denote a list of strings l, where l∈L, and where each l contains multiple tokens (e.g., words and/or numbers), and L is of length m. Let P denote a list of strings p, where p∈P, and where each p contains multiple tokens (e.g., words and/or numbers), and P is of length n. Lists L and P (e.g., which provide input string data 301 to the string co-clustering algorithm 303 in FIG. 3) are independent, in that L≠P. Each l is compared against all p∈P using an edit distance or Jaro string similarity calculation (e.g., utilizing string similarity calculation module 305 of string co-clustering algorithm 303). This results in a similarity matrix S of dimension m×n containing the elements $s_{ij} \in S$, where $s_{ij} \geq 0$ indicates the similarity of the strings at i and j, where i and j are positive integers, and where i≤m and j≤n. The string similarity values $s_{ij}$ of the edit distance calculation may be normalized such that $s_{ij} \in [0,1]$, where $s_{ij}=1$ indicates identical strings. It should be noted that normalization is not required when using Jaro similarity metrics, as the values produced are already normalized such that $s_{ij} \in [0,1]$.

An undirected simple graph G is defined as a pair (V, E) where $v_n \in V$ are the nodes of G, and $e \in E$ are the edges of G that connect the nodes. In a simple graph, all edges connect distinct vertices, there can be at most one edge between a given pair of vertices, and there are no self-loops. Each $e \in E$ is an unordered pair of vertices, with the edge connecting distinct vertices a and b written as a pair (a, b).

Graph G is bipartite if V can be partitioned into two sets, $V_1$ and $V_2$, such that no two v from either set are adjacent (e.g., they do not share $e \in E$), and all $e \in E$ has one end of e in $V_1$ and one end in $V_2$. The $V_1$ set of nodes is of length m, and the $V_2$ set of nodes is of length n.

Bipartite graph Q is defined by a biadjacency matrix B of dimension m×n containing the elements $b_{ij} \in B$, where $b_{ij}=1$ if $v_i$ and $v_j$ share an edge, and $b_{ij}=0$ otherwise:

$$b_{ij} = \begin{cases} 1 & \text{if } (i, j) \in E \\ 0 & \text{if } (i, j) \notin E \end{cases}$$

Bipartite graph Q can also be defined by an adjacency matrix A of (m+n)×(m+n) dimensions containing the elements $a_{ij} \in A$, where $a_{ij}=1$ if $v_i$ and $v_j$ share an edge, $a_{ij}=0$ otherwise, and i and j are positive integers ≤(m+n). The A of Q is a sparse matrix composed of submatrices B and $B^T$:

$$A = \begin{bmatrix} 0_{m \times m} & B \\ B^T & 0_{n \times n} \end{bmatrix}$$

Figure 4:
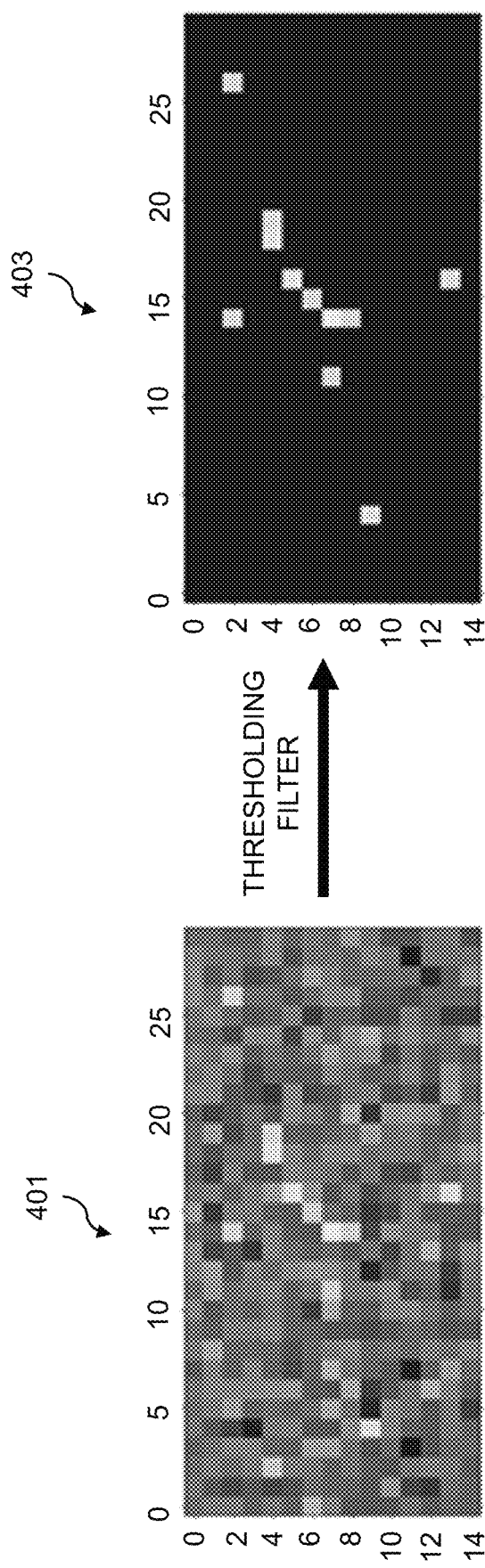
FIG. 4 shows heat maps illustrating application of a thresholding filter in an illustrative embodiment.

A shifted Heaviside unit step function H [x, τ] is applied to S as a thresholding filter (e.g., utilizing the thresholding filter module 307 of string co-clustering algorithm 303). The thresholding filter is important in some embodiments, as B=H[S, τ]. Biadjacency matrix B is related to A, as shown in the above equation. Adjacency matrix A contains E of G, and therefore greater τ values decrease E, whereas lower τ values increase E. Thus, τ serves as a hyperparameter for graph coarsening. FIG. 4 illustrates heat maps 401 and 403 of S and B, illustrating B=H [S, τ], where m=15, n=30, and τ=0.35. In the heat map 403, darker shade represents $s_{ij}$, $b_{ij}=0$ and lighter shade represents $s_{ij}$, $b_{ij}=1$, where $0 \leq s_{ij} \leq 1$. The threshold τ∈[0,1] may be user-defined, whereby $s_{ij} < \tau$ is mapped to zero and $s_{ij} > \tau$ is mapped to one when H[S, τ]:

$$H[S, \tau] = \begin{cases} 1 & \text{if } s_{ij} \geq \tau \\ 0 & \text{if } s_{ij} < \tau \end{cases}$$

In some embodiments, 0.8≤τ≤0.9 provides favorable outcomes.

Application of the thresholding filter H[S, τ] provides B, which results in Q and G (e.g., utilizing the graph network generation module 309 of string co-clustering algorithm 303). Hierarchical graph clustering of G is achieved via the Louvain community detection algorithm (e.g., utilizing the community detection module 311 of the string co-clustering algorithm 303), which maximizes the modularity Y of the communities c E G. The Louvain community detection algorithm is inspired by the idea that c can be destroyed by randomizing G, thus comparing $E_{actual}$ in G and $E_{random}$ in G affirms the credibility of c in G. In order to maximize Y, the Louvain community detection algorithm recursively attempts to maximize the difference between $E_{actual}$ in c and $E_{random}$ in c by removing $v_i$ from $c_i$ and placing $v_i$ into $c_j$. The Louvain community detection algorithm is initialized by assigning a unique c for all v E G. The maximization of Y by moving $a_{ij}$ into a different c is recursively defined:

$$Y = \frac{1}{2h} \sum_{ij} \left( a_{ij} - \frac{k_i k_j}{2h} \right) \delta(c_i, c_j)$$

where h is the number of E∈G, $a_{ij}$ is a v∈G, $k_i$ and $k_j$ are the degrees (e.g., number of incident edges) of $v_i$ and $v_j$, respectively, and the δ term at the end of the equation is the Kronecker delta of $c_i$ and $c_j$. This calculation is repeated for all $a_{ij}$ until Y is maximized.

The Louvain community detection algorithm advantageously has decreased computational time as compared with other community detection algorithms while still providing high-quality results. As discussed above, the selection of the r value during the thresholding filter step impacts the string co-clustering algorithm results. In some embodiments, $0.8 \leq \tau \leq 0.9$ is selected for the use case of co-clustering strings of U.S. mailing addresses, though it should be appreciated that other values and value ranges may be used as desired. The string co-clustering algorithm, in some embodiments, is constructed for flexibility in that the minimum co-cluster size cut-off $\kappa$ may be user-defined, where $\kappa$ is an integer $\geq 1$, and co-cluster sizes $<\kappa$ are not assigned co-cluster names.

All strings may be case-normalized and excessive whitespace, special characters, and diacritics may be stripped prior to analysis. Mailing addresses may also be standardized according to United States Postal Service standards, then tokenized and sorted prior to analysis.

The above-described string co-clustering algorithm, using the edit distance string similarity calculation, was applied to two independent mailing address data sets A and B where m=10,000, n=5,000, $\tau$=0.85, and $\kappa$=3, which resulted in the identification of 57 overlapping co-clusters of 3 or more members with the largest co-cluster containing 290 members. Subtle spelling errors, as well as the addition or deletion of small words or numbers within the full string, are placed within the same co-cluster. This is illustrated by table 500 in FIG. 5. Additionally, entries with single-character deletions, insertions, and substitutions were detected as approximate string matches and co-clustered together.

Figure 6:
FIG. 6 illustrates a table illustrating calculation times for a string co-clustering algorithm in an illustrative embodiment.

The similarity calculation exhibits favorable results as the data set scaled from m=200 to m=100,000 strings, and was compared against an independent list of strings that scaled from n=100 to n=5,000 strings. Table 600 in FIG. 6 illustrates the wall times for the similarity calculation, which are of O(mn) order. As illustrated in table 600, co-clustering results were achieved in a reasonable timeframe. Further, the string co-clustering algorithm is able to evaluate approximately 100,000 comparisons per second to provide string co-clusters. This wall time analysis included strings in $L_m$ with a mean length of 49 characters and 8 tokens per string and strings in $P_n$ with a mean length of 42 characters and 7 tokens per string. All calculations were conducted in a VMware® Horizon virtual desktop infrastructure (VDI) environment which was allocated 4 virtual central processing unit (vCPU) cores and 8 gigabytes (GB) of random-access memory (RAM). The VDI ran on an Intel® Xeon® Gold 6148 CPU at 2.40 GHz on a Dell EMC PowerEdge™ R740xd server. The values shown in table 600 are a mean of three different runs through the string co-clustering algorithm, and the wall times are shown in seconds (s).

The string co-clustering algorithms described herein demonstrate an efficient approach for string co-clustering of the example use case scenario involving independent mailing address data sets. The application of similarity calculations to text strings allows for constructing relationships between previously unstructured text data. The results of the string similarity calculations provide a similarity matrix, which was subjected to a thresholding filter. The output of the thresholding filter step created the biadjacency matrix of a graph network. The resulting graph network was subjected to a community detection algorithm to provide string co-clusters. Overall, the string co-clustering algorithm demonstrates reasonable wall times for the co-clustering of two independent string data sets (e.g., with the sample data set including up to 100,000 strings in one set and up to 5,000 strings in the other data set).

The string co-clustering technique described herein may be used in a wide variety of application areas. One such application area is in anomaly detection or other pattern recognition. For example, an enterprise system may provide services consumed by a set of users (e.g., users of the enterprise, customers of the enterprise, etc.). The enterprise system has a goal of delivering quality services in a timely manner, and thus may seek to monitor user activity for anomalies or other patterns. In some embodiments, for example, the enterprise system may seek to monitor user activity to detect abnormal behavior. The abnormal behavior may be a result of problems in service delivery, technical issues with services provided to the users, misuse of the services provided to the users (e.g., indicative of fraudulent activity), etc.

Consider, as an example, string co-clustering applied to warranty data for services offered by an enterprise system. The string co-clustering algorithm may be applied to analyze different user profiles to determine if a particular user or users have, for example, submitted frequent and similar (but not the same) information or requests while seeking warranty or other services offered by the enterprise system. For example, different repair centers of an enterprise system may maintain separate databases of customer or other user requests to diagnose and repair assets. The information in such different databases may form independent lists of strings that can be co-clustered using the techniques described herein. Various other examples are possible, such as comparing different lists of users (e.g., name, mailing addresses, etc.) that submit different types of requests. The string co-clustering information may be combined with other database information to create a graph network of the users of such services, which is analyzed for high degrees of connectivity indicative of abnormal behavior. The graph network illustratively provides insights and connectivity information that is not immediately available from unstructured string data.

The string co-clustering techniques described herein may be used in various other application areas, such as in comparison of master lists against other internal records (e.g., for consistency, anomalies, etc.), as well as other information retrieval and analysis in areas of master record alignment and named entity recognition processes.

FIG. 7 illustrates a view of a graph network before and after application of string co-clustering as described herein. FIG. 7 shows a view 701 of data comprising a plurality of nodes representing strings from two different lists (e.g., with dark shaded nodes from a first list and light shaded nodes from a second list) with no defined connections, network or relationships. After application of the string co-clustering techniques described herein, the view 701 may be converted to the view 703 with connections among the plurality of nodes in the different lists (e.g., edges) allowing construction of the graph network. The sizes of the nodes in the view 703 are also based on the degree of connectivity (e.g., where higher degrees of connectivity result in larger nodes). In the FIG. 7 example, the nodes with a high degree of connectivity may correspond to users of an enterprise system that are exhibiting abnormal behavior. In the view 703, the edges are not directional, and self-loops are omitted (e.g., the view 703 provides an undirected simple graph network). In other embodiments, however, it may be desired to use directed edges or incorporate self-loops.

Abnormal behavior may also be detected by comparing multiple graph networks with one another. User data may be available for multiple attributes, and a graph network may be created for each of the multiple attributes. Anomalies may be detected by considering situations in which a particular user or other data point is in a first string co-cluster for a first attribute but a second string co-cluster for a second attribute. Consider, as an example, user data that has a first attribute of a U.S. mailing address and a second attribute of name (e.g., a company name). If a given user is in a first string co-cluster for U.S. mailing address that does not match a second string co-cluster for name, this may be indicative of an anomaly. This information may be used to initiate various remedial action as desired, such as analyzing user data to determine if there is fraudulent or suspicious activity (e.g., utilizing multiple names with the same U.S. mailing address, or the same mailing address being associated with multiple different names). It should be noted, however, that an anomaly is not necessarily associated with fraudulent or suspicious activity. An office building, for example, may be associated with a cluster of U.S. mailing addresses (e.g., with different floor numbers, suite numbers, etc.) that are associated with many different names (e.g., of workers in such different offices). In other instances, however, the anomaly may be associated with suspicious behavior, such as where the same or similar name is submitting service requests for many different addresses, or where the same or similar address is associated with service requests for multiple different names.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for monitoring information processing systems utilizing co-clustering of strings in different sets of data records will now be described in greater detail with reference to FIGS. 8 and 9. Although described in the context of system 100, these platforms may also be used to implement at least portions of other information processing systems in other embodiments.

Figure 8:
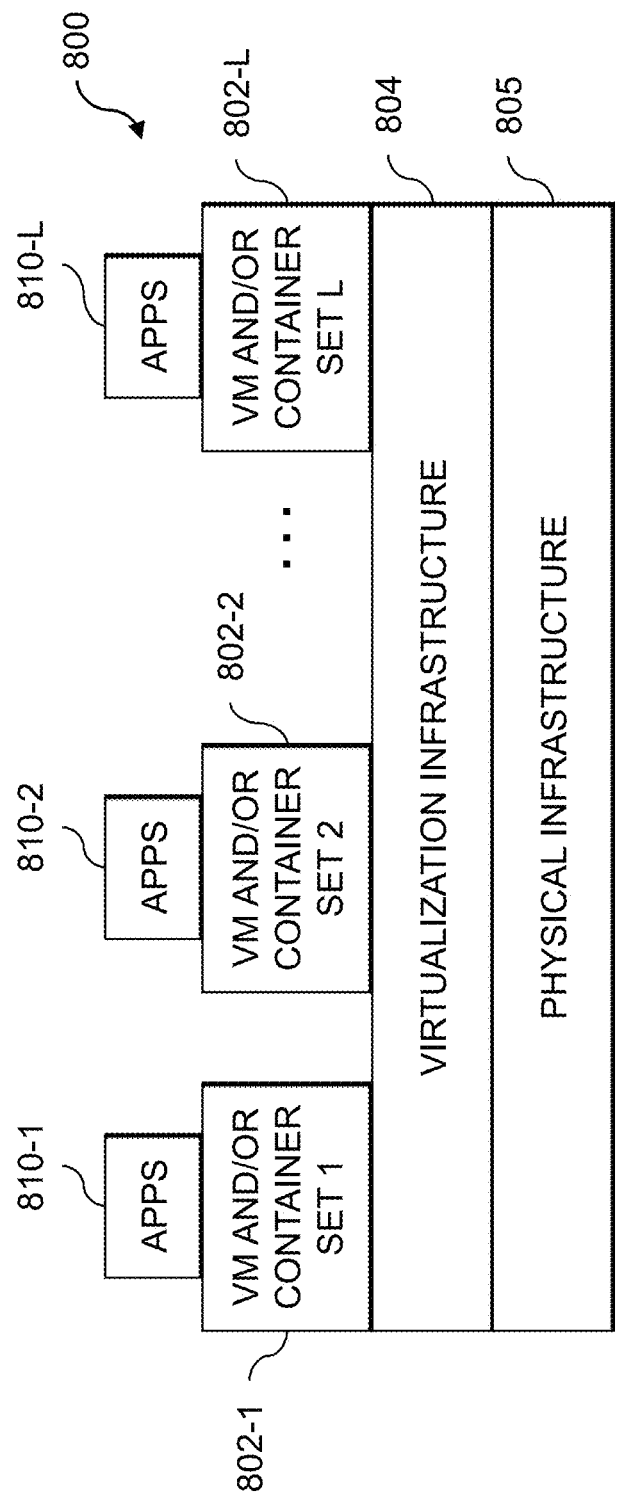

FIG. 8 shows an example processing platform comprising cloud infrastructure 800. The cloud infrastructure 800 comprises a combination of physical and virtual processing resources that may be utilized to implement at least a portion of the information processing system 100 in FIG. 1. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for monitoring information processing systems utilizing co-clustering of strings in different sets of data records as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, data records, attributes, string similarity calculations, thresholding filters, community detection algorithms, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   obtaining two or more sets of data records, each of at least a subset of the data records in each of the two or more sets of data records comprising at least a first string associated with a first attribute and a second string associated with a second attribute;
   generating at least one similarity matrix, wherein entries of the at least one similarity matrix comprise values characterizing similarity between respective pairs of string values associated with at least one of the first attribute and the second attribute, each pair of strings comprising a first string value from one of the data records in a first one of the two or more sets of data records and a second string value from one of the data records in a second one of the two or more sets of data records;
   constructing at least one graph network based at least in part on the at least one similarity matrix, the at least one graph network comprising a first graph network for the first attribute and a second graph network for the second attribute, each of the first graph network and the second graph network comprising edges connecting pairs of the data records in the two or more sets of data records based at least in part on values of entries in the at least one similarity matrix, at least one of the edges connecting a first data record in the first set of data records with a second data record in the second set of data records;
   performing at least one clustering operation on the at least one graph network to identify a first set of one or more clusters of the data records in the first graph network for the first attribute and a second set of one or more clusters of the data records in the second graph network for the second attribute; and
   initiating at least one remedial action responsive to identifying at least one data record that is in a first cluster with a first subset of the data records in the two or more sets of data records for the first attribute and is in a second cluster with a second subset of the data records in the two or more sets of data records for the second attribute, the second subset of the data records being different than the first subset of the data records.

2. The apparatus of claim 1 wherein the first set of data records is independent of the second set of data records.

3. The apparatus of claim 1 wherein the first set of data records is obtained from a first data source in an information processing system and the second set of data records is obtained from a second data source in the information processing system.

4. The apparatus of claim 1 wherein generating the at least one similarity matrix comprises performing string similarity calculations for the pairs of the strings.

5. The apparatus of claim 4 wherein the string similarity calculations comprise one or more edit distance calculations.

6. The apparatus of claim 5 wherein the one or more edit distance calculations comprises at least one of a Levenshtein edit distance calculation and a Jaro-Winkler edit distance calculation.

7. The apparatus of claim 1 wherein the at least one processing device is further configured to perform the step of applying a thresholding filter to values in the entries of the at least one similarity matrix to create at least one biadjacency matrix, and wherein constructing the at least one graph network is based at least in part on the at least one biadjacency matrix.

8. The apparatus of claim 7 wherein applying the thresholding filter comprises setting entries of the at least one similarity matrix with values below a designated threshold to a first value and setting entries of the at least one similarity matrix with values at or above the designated threshold to a second value.

9. The apparatus of claim 8 wherein constructing the at least one graph network comprises connecting pairs of the data records in the two or more sets of data records having entries in the at least one biadjacency matrix with the second value, and refraining from connecting pairs of the data records in the two or more sets of data records having entries in the at least one biadjacency matrix with the first value.

10. The apparatus of claim 1 wherein performing the at least one clustering operation comprises performing community detection on the at least one graph network using a community detection algorithm, the community detection algorithm comprising a Louvain community detection algorithm.

11. The apparatus of claim 1 wherein the two or more sets of data records are associated with a plurality of assets of an information technology infrastructure, the plurality of assets comprising at least one of physical and virtual computing resources in the information technology infrastructure, and wherein initiating the at least one remedial action comprises at least one of:

applying one or more security hardening procedures to one or more of the plurality of assets associated with the data records in the given cluster; and modifying a configuration of one or more of the plurality of assets associated with the data records in the given cluster.

12. The apparatus of claim 1 wherein the two or more sets of data records are associated with a plurality of users of an information technology infrastructure, and wherein initiating the at least one remedial action in the enterprise system comprises at least one of:

blocking access, by one or more of the plurality of users associated with the data records in the given cluster, to one or more of a plurality of assets of the information technology infrastructure, the plurality of assets comprising at least one of physical and virtual computing resources; and monitoring subsequent access, by one or more of the plurality of users associated with the data records in the given cluster, to one or more of the plurality of assets.

13. The apparatus of claim 1 wherein:

generating the at least one similarity matrix comprises generating a first similarity matrix for the first strings associated with the first attribute, generating a second similarity matrix for the second strings associated with the second attribute, applying a first thresholding filter to values in entries of the first similarity matrix to generate a first biadjacency matrix, and applying a second thresholding filter to values in entries of the second similarity matrix to generate a second biadjacency matrix; and constructing the at least one graph network comprises constructing a first graph network based at least in part on the first biadjacency matrix and constructing a second graph network based at least in part on the second biadjacency matrix.

14. The apparatus of claim 1 wherein the first attribute comprises a mailing address and the second attribute comprises a name.

15. The apparatus of claim 1 wherein performing the at least one clustering operation comprises determining a degree of connectivity of a given one of the clusters in the first set of clusters and the second set of clusters, the degree of connectivity of the given cluster being based at least in part on similarity of string values for the at least one data record from the first set of data records and the at least one data record from the second set of data records that are part of the given cluster.

16. A computer program product comprising a non-transitory processor-readable storage medium having stored therein program code of one or more software programs, wherein the program code when executed by at least one processing device causes the at least one processing device to perform steps of:

obtaining two or more sets of data records, each of at least a subset of the data records in each of the two or more sets of data records comprising at least a first string associated with a first attribute and a second string associated with a second attribute;

generating at least one similarity matrix, wherein entries of the at least one similarity matrix comprise values characterizing similarity between respective pairs of string values associated with at least one of the first attribute and the second attribute, each pair of strings comprising a first string value from one of the data records in a first one of the two or more sets of data records and a second string value from one of the data records in a second one of the two or more sets of data records;

constructing at least one graph network based at least in part on the at least one similarity matrix, the at least one graph network comprising a first graph network for the first attribute and a second graph network for the second attribute, each of the first graph network and the second graph network comprising edges connecting pairs of the data records in the two or more sets of data records based at least in part on values of entries in the at least one similarity matrix, at least one of the edges connecting a first data record in the first set of data records with a second data record in the second set of data records;

performing at least one clustering operation on the at least one graph network to identify a first set of one or more clusters of the data records in the first graph network for the first attribute and a second set of one or more clusters of the data records in the second graph network for the second attribute; and initiating at least one remedial action responsive to identifying at least one data record that is in a first cluster with a first subset of the data records in the two or more sets of data records for the first attribute and is in a second cluster with a second subset of the data records in the two or more sets of data records for the second attribute, the second subset of the data records being different than the first subset of the data records.

17. The computer program product of claim 16 wherein the first set of data records is independent of the second set of data records.

18. A method comprising steps of:

obtaining two or more sets of data records, each of at least a subset of the data records in each of the two or more sets of data records comprising at least a first string associated with a first attribute and a second string associated with a second attribute;

generating at least one similarity matrix, the at least one graph network a first graph network for the first attribute and a second graph network for the second attribute, each of the first graph network and the second graph network comprising edges connecting pairs of the data records in the two or more sets of data records based at least in part on values of entries in the at least one similarity matrix, at least one of the edges connecting a first data record in the first set of data records with a second data record in the second set of data records;

constructing at least one graph network based at least in part on the at least one similarity matrix, the at least one graph network comprising a first graph network for the first attribute and a second graph network for the second attribute, each of the first graph network and the second graph network comprising edges connecting pairs of the data records in the two or more sets of data records based at least in part on values of entries in the at least one similarity matrix, at least one of the edges connecting a first data record in the first set of data records with a second data record in the second set of data records;

performing at least one clustering operation on the at least one graph network to identify a first set of one or more clusters of the data records in the first graph network for the first attribute and a second set of one or more clusters of the data records in the second graph network for the second attribute; and initiating at least one remedial action responsive to identifying at least one data record that is in a first cluster with a first subset of the data records in the two or more sets of data records for the first attribute and is in a second cluster with a second subset of the data records in the two or more sets of data records for the second attribute, the second subset of the data records being different than the first subset of the data records;

wherein the method is performed by at least one processing device comprising a processor coupled to a memory.

19. The method of claim 18 wherein the first set of data records is independent of the second set of data records.

20. The apparatus of claim 15 wherein initiating at least one remedial action is further responsive to determining that the degree of connectivity of the given cluster exceeds a designated connectivity threshold.

* * * * *